(12) United States Patent
Johnson et al.

(10) Patent No.: US 9,993,013 B2
(45) Date of Patent: Jun. 12, 2018

(54) ICING COMPOSITION COMPRISING MANNITOL PARTICLES FOR BAKERY PRODUCTS

(71) Applicant: Bakery Supplies Europe Holding B.V., Amsterdam (NL)

(72) Inventors: Michael Kenneth Johnson, Meols Merseyside (GB); Jacob Ailko De Vries, Bergen op Zoom (NL); Kai Alexander Heuberger, Bremerhaven (DE); Pieter Moret, Kapelle (NL)

(73) Assignee: BAKERY SUPPLIES EUROPE HOLDING B.V., Amsterdam (NL)

( * ) Notice: Subject to any disclaimer, the term of this patent is extended or adjusted under 35 U.S.C. 154(b) by 0 days. days.

(21) Appl. No.: 14/426,721

(22) PCT Filed: Sep. 5, 2013

(86) PCT No.: PCT/NL2013/050639
§ 371 (c)(1),
(2) Date: Mar. 6, 2015

(87) PCT Pub. No.: WO2014/038936
PCT Pub. Date: Mar. 13, 2014

(65) Prior Publication Data
US 2015/0216198 A1 Aug. 6, 2015

(30) Foreign Application Priority Data
Sep. 6, 2012 (EP) ................................. 12183271

(51) Int. Cl.
*A23G 3/42* (2006.01)
*A23G 3/34* (2006.01)
*A21D 13/60* (2017.01)
*A21D 13/24* (2017.01)
*A21D 13/28* (2017.01)
*A21D 13/80* (2017.01)

(52) U.S. Cl.
CPC .............. *A23G 3/42* (2013.01); *A21D 13/24* (2017.01); *A21D 13/28* (2017.01); *A21D 13/60* (2017.01); *A21D 13/80* (2017.01); *A23G 3/343* (2013.01)

(58) Field of Classification Search
CPC .................................. A23G 3/42; A23G 3/343
See application file for complete search history.

(56) References Cited

U.S. PATENT DOCUMENTS

| 3,676,155 | A |   | 7/1972 | Horn et al. |
|---|---|---|---|---|
| 3,769,438 | A |   | 10/1973 | Rusch et al. |
| 4,105,801 | A | * | 8/1978 | Dogliotti ................. 426/99 |
| 4,293,570 | A | * | 10/1981 | Vadasz ..................... 426/3 |
| 4,317,838 | A | * | 3/1982 | Cherukuri et al. ........... 426/5 |
| 4,610,884 | A |   | 9/1986 | Lewis et al. |
| 5,017,392 | A | * | 5/1991 | Bombardier et al. ....... 426/659 |
| 5,900,261 | A | * | 5/1999 | Ribadeau-Dumas et al. .... 426/5 |
| 2002/0160083 | A1 |   | 10/2002 | Ribadeau-Dumas |
| 2004/0131752 | A1 |   | 7/2004 | Best et al. |
| 2004/0228957 | A1 |   | 11/2004 | Schmidt |
| 2007/0207240 | A1 | * | 9/2007 | Hansen .............. A21D 2/186 426/94 |

FOREIGN PATENT DOCUMENTS

EP 0 347 121 A2 12/1989
WO WO-02/17728 A2 3/2002

OTHER PUBLICATIONS

International Search Report of PCT/NL2013/050639 dated Dec. 11, 2013, 3 pages.

* cited by examiner

*Primary Examiner* — D. Lawrence Tarazano
*Assistant Examiner* — Stephanie A Cox
(74) *Attorney, Agent, or Firm* — Gilberto M. Villacorta; Sunit Talapatra; Foley & Lardner LLP

(57) ABSTRACT

The invention relates to an icing composition that consists of: 30-75 wt. % of fine carbohydrate particles containing at least 90 wt. % of crystalline carbohydrate, at least 90 wt. % of said fine carbohydrate particles having diameter of less than 50 μm; 15-50 wt. % of fat having a melting point of at least 20° C.; 0-30 wt. % water; and 0.1-30 wt. % of other edible ingredients; wherein the fine carbohydrate particles comprise: —50-100 wt. % of mannitol particles containing at least 90 wt. % mannitol; —0-50 wt. % of sugar particles containing at least 90 wt. % of one or more sugars selected from sucrose, glucose, fructose, lactose and maltose. The icing composition enables the preparation of iced bakery products that exhibit high freeze-thaw stability and that can suitably be stored for several days under ambient conditions without becoming stale. The invention further provides a method of preparing a bakery product that comprises applying the aforementioned icing composition onto a fully cooked bakery product as well as an iced bakery product comprising a fully cooked bakery product that is covered with a layer of such an icing composition.

9 Claims, No Drawings

ICING COMPOSITION COMPRISING MANNITOL PARTICLES FOR BAKERY PRODUCTS

TECHNICAL FIELD OF THE INVENTION

The present invention relates to an icing composition for bakery and confectionary products. More particularly, the invention provides an icing composition consisting of:
- 30-75 wt. % of fine carbohydrate particles containing at least 90 wt. % of crystalline carbohydrate, at least 90 wt. % of said fine carbohydrate particles having diameter of less than 50 μm;
- 15-50 wt. % of fat having a melting point of at least 20° C.;
- 0-30 wt. % water; and
- 0.1-30 wt. % of other edible ingredients;

wherein the fine carbohydrate particles comprise 50-100 wt. % of mannitol particles, and 0-50 wt. % of sugar particles containing one or more sugars selected from sucrose, glucose, fructose, lactose and maltose.

Another aspect of the invention relates to a iced bakery product that is covered with a layer of such an icing composition. The icing composition according to the present invention offers the advantage that once it has been applied onto a fully cooked bakery product it remains stable for several days. Unlike conventional icings, the icings according to the present invention do not destabilize during storage due to absorption of atmospheric water and/or of water contained in the bakery product onto which the icing is applied.

BACKGROUND OF THE INVENTION

In the bakery industry staling as perceived by the firming of the food product due to moisture loss has always been an issue. This is especially true in fried bakery product such as doughnuts. The moisture of the fried baked product will migrate from the high vapor pressure area (inside the product) to the low vapor pressure area (low moisture surface) until equilibrium in the vapor pressure and moisture is reached. As this process continues the inside portion of the product known as the crumb has a decrease in moisture content which contributes to the perceived staleness and hardening of the fried bakery product. Doughnuts contained in a storage box become firm and slightly mealy after 2 or 3 days. When a conventional icing is applied to a fried bakery product, these products, especially doughnuts, stale even more rapidly due to the rapid moisture migration from the crumb of the fried bakery product to the icing.

Freeze-thaw stability is another problem associated with iced bakery products. Food consumers are increasingly demanding high quality food products that are nevertheless convenient and simple to prepare. While freezing is a convenient method of storing high quality food items, products can undergo undesirable changes during frozen storage. Also, thawing of the product can lead to modifications of the product that are undesirable. In particular, frozen products, such as icings, with very high concentrations of sugar can undergo undesirable changes upon frozen storage and/or upon thawing. During thawing atmospheric water will condense onto the icing. Furthermore, icings with high sucrose concentrations tend to attract moisture, which can collect on the surface of the icing. This moisture build-up is termed weeping. Moisture absorption also adversely affects the integrity of the icing and ultimately can cause the icing to slide off.

U.S. Pat. No. 5,028,442 describes a method of providing an improved donut which comprises:
a) covering a donut with a substantially uniform coating, said coating comprises:
 1. 60-95 wt. % of an edible lipid having a melting point above 99° F.; and
 2. an amount of aqueous soluble sugar-containing syrup and water or water alone added to ingredient (1) to produce a moisture content in the coating composition having a relative humidity from 73-75% as measured in a sealed air-tight box having a controlled starting headspace of 70° F./60% relative humidity environment of 100 grams of said coating spread evenly onto a surface of a pan recorded at five minute intervals until the substantially equilibrated relative humidity is obtained; and
b) coating the product of (a) with a substantially uniform coating of icing.

The coating composition controls moisture migration for e.g. chocolate coated donuts which remain soft in texture and of stable quality over extended periods of time.

U.S. Pat. No. 5,304,389 describes a non-hygroscopic icing composition comprising sugar, fat and an emulsifier as the main components, wherein 80% by weight or more of said sugar is particles passing through a 63 μm mesh size sieve and 50% by weight or more of said sugar is particles having a size of from 45 μm to 63 μm and the sugar content in the icing is 50% by weight or more. Sucrose, glucose, erythritol, lactose, palatinose, DFA III and maltose are mentioned as examples of sugars that can be used.

WO 01/19203 describes a reheating tolerant icing composition containing at least 20 wt. % water, at least 0.1 wt. % gelling agent, 1-30 wt. % of a high solubility sugar and at least 5 wt. % of a low solubility sugar, the low solubility sugar having a solubility in water of less than 40 wt. % at 20° C., wherein said composition contains no more than 35 wt. % sucrose. Lactose, isomalt, mannitol and erythritol are mentioned as examples of low solubility sugars.

US 2004/0131752 describes a melt-resistant fudge article which comprises:
 a liquid fat;
 a matrix of sugar crystals; and
 an emulsifier component to facilitate formation of the liquid fat component into droplets of at least substantially uniform size.

The sugar may include at least one of sucrose, glucose, fructose, lactose, lactulose, maltose, trehalose, invert sugar, corn syrup, honey, and the sugar alcohol includes at least one of sorbitol, mannitol, maltitol, xylitol, erythritol, lactitol, or a combination thereof.

SUMMARY OF THE INVENTION

The inventors have developed a special icing composition that enables the preparation of iced bakery products that exhibit high freeze-thaw stability and that can suitably be stored for several days under ambient conditions without becoming stale. The icing composition of the present invention consists of:
- 30-75 wt. % of fine carbohydrate particles containing at least 90 wt. % of crystalline carbohydrate, at least 90 wt. % of said fine carbohydrate particles having diameter of less than 50 μm;
- 15-50 wt. % of fat having a melting point of at least 20° C.;
- 0-30 wt. % water; and
- 0.1-30 wt. % of other edible ingredients;

wherein the fine carbohydrate particles comprise:
- 50-100 wt. % of mannitol particles containing at least 90 wt. % mannitol;
- 0-50 wt. % of sugar particles containing at least 90 wt. % of one or more sugars selected from sucrose, glucose, fructose, lactose and maltose.

The use of very fine mannitol particles in the above indicated concentration yields an icing composition that is perfectly suited for use in the production of, for instance, frozen iced doughnuts. The inventors have found that frozen iced doughnuts that were prepared using the present icing composition after thawing could be kept under ambient conditions for several days. Unlike frozen iced doughnuts made with conventional sucrose-based icings, the icing composition of the present invention hardly absorbs any water from the bakery product onto which it is applied. Surprisingly, the mannitol-based icing compositions of the present invention were found to be clearly superior in terms of their water absorption characteristics to similar icing compositions based on non-hygroscopic carbohydrates such as trehalose and palatinose.

The invention further provides a method of preparing a bakery product that comprises applying the aforementioned icing composition onto a fully cooked bakery product as well as an iced bakery product comprising a fully cooked bakery product that is covered with a layer of such an icing composition.

DETAILED DESCRIPTION OF THE INVENTION

Accordingly, one aspect of the invention relates to an icing composition consisting of:
- 30-75 wt. % of fine carbohydrate particles containing at least 90 wt. % of crystalline carbohydrate, at least 90 wt. % of said fine carbohydrate particles having diameter of less than 50 μm;
- 15-50 wt. % of fat having a melting point of at least 20° C.;
- 0-30 wt. % water; and
- 0.1-30 wt. % of other edible ingredients;

wherein the fine carbohydrate particles comprise:
- 50-100 wt. % of mannitol particles containing at least 90 wt. % mannitol;
- 0-50 wt. % of sugar particles containing at least 90 wt. % of one or more sugars selected from sucrose, glucose, fructose, lactose and maltose.

The term "fat" as used herein, unless indicated otherwise, refers to a lipids selected from triglycerides, diglycerides, monoglycerides, fatty acids, phosphoglycerides, sucrose fatty acid esters and combinations thereof.

Mannitol ((2R,3R,4R,5R)-Hexan-1,2,3,4,5,6-hexol) is a white, crystalline sugar alcohol. Mannitol does not stimulate an increase in blood glucose, and is therefore used as a sweetener for people with diabetes, and in chewing gums.

The fine carbohydrate particles typically constitute 40-70 wt. % of the icing composition. More preferably, the icing composition contains 45-67 wt. %, most preferably 50-65 wt. % of the fine carbohydrate particles.

The fine carbohydrate particles typically contain at least 95 wt. %, most preferably at least 98 wt. % of crystalline carbohydrate.

The quality of the icing composition of the present invention is strongly influenced by the particle size distribution of the fine carbohydrate particles. Preferably, at least 90 wt. % of the fine carbohydrate particles have a diameter in the range of 1-50 μm, more preferably in the range of 5-50 μm and most preferably in the range of 20-45 μm. According to another preferred embodiment the aforementioned particle size ranges apply to the mannitol particles as well as to the sugar particles, provided the latter particles are contained in the icing composition.

Unlike the icing compositions described in U.S. Pat. No. 5,304,389, the icing composition according to the present invention typically contains less than 40% by weight, more preferably less than 30% by weight and most preferably less than 20% by weight of carbohydrate particles having a size of 32 μm to 63 μm.

The benefits of the present invention are particularly pronounced in case the mannitol particles represent the bulk of the fine carbohydrate particles. Advantageously, the fine carbohydrate particles comprise 60-100 wt. % of the mannitol particles and 0-40 wt. % of the sugar particles, even more preferably, 70-100 wt. % of the mannitol particles and 0-30 wt. % of the sugar particles. Most preferably, the carbohydrate particles comprise 75-100 wt. % of the mannitol particles and 0-25 wt. % of the sugar particles.

According to another preferred embodiment the mannitol particles and the sugar particles together represent at least 70 wt. % of the fine carbohydrate particles. Even more preferably, the mannitol particles and the sugar particles together represent at least 80 wt. %, yet more preferably at least 90 wt. % and most preferably 100 wt. % of the fine carbohydrate particles.

The mannitol particles preferably contain at least 95 wt. %, most preferably at least 98 wt. % of mannitol.

The sugar particles preferably contain at least 90 wt. % of one or more sugars selected from sucrose, glucose, fructose and lactose, even more preferably selected from sucrose and lactose. Most preferably, the sugar particles contain at least 90 wt. % of sucrose.

The fat content of the icing composition typically lies in the range of 10-50 wt. %. More preferably, the fact content is in the range of 15-45 wt. %, most preferably of 20-40 wt. %.

The fat employed in the icing composition typically has a slip melting point of at least 24° C., more preferably of at least 26° C. and most preferably of 28-45° C. Typically, said fat contains at least 95 wt %., most preferably at least 98 wt. % triglycerides.

Preferably, the water content of the icing composition is less than 15 wt. %, more preferably less than 9.5 wt. %. Most preferably, the icing composition contains less than 3 wt. % water.

Besides the fine carbohydrate particles, fat and water the present icing composition may suitably contain other edible ingredients. These other edible ingredients may suitably be selected from cocoa powder, emulsifiers, anti-oxidants, flavours, colours and combinations of these ingredients.

Typically, the composition contains 2-25 wt. %, more preferably 3-20 wt % and most preferably 4-15 wt. % of the other edible ingredients.

The icing composition advantageously contains 0.05-3 wt. %, more preferably 0.1-1.0 wt. % and most preferably 0.15-0.75 wt. % of an emulsifier. Examples of emulsifiers that may be employed include phospholipids, mono-di glycerides (E471) and polysorbate (E435) and combinations thereof. Most preferably the emulsifier employed is phospholipid.

According to a particularly preferred embodiment, the icing composition contains cocoa powder. Even more preferably, the icing composition contains 1-15 w %., most preferably 5-10 wt. % of cocoa powder.

According to another preferred embodiment the fine carbohydrate particles are homogeneously distributed throughout the icing composition.

Another aspect of the invention relates to a method of preparing a bakery product comprising applying an icing composition as defined herein before onto a fully cooked bakery product.

According to a preferred embodiment, the aforementioned bakery product is obtained by a method as defined herein before.

According to a particularly preferred embodiment of the present method, the bakery product is frozen after the icing composition has been applied. The benefits of the present invention are particularly appreciated in case the icing composition is applied on a bakery product that is stored and distributed in frozen form. Upon thawing water condensates onto the cold icing. The icing composition of the present invention offers the advantage that is much less sensitive to such condensation than conventional icing compositions.

Examples of fully cooked bakery products that may suitably be provided with an icing in accordance with the present method include doughnuts, muffins, loaf cakes and a bread rolls. Most preferably, the fully cooked bakery product is a doughnut.

The icing composition may suitably be applied onto the fully cooked bakery products by means of spraying, brushing, spreading, dipping and combinations thereof.

The icing composition is typically applied in an amount of 1-20 g/dm$^2$, more preferably in an amount of 4-12 g/dm$^2$, most preferably in an amount of 5-10 g/dm$^2$.

Yet another aspect of the invention relates to an iced bakery product comprising a fully cooked bakery product that is covered with a layer of an icing composition as defined herein before.

According to a particularly preferred embodiment, the aforementioned iced bakery product is a frozen product.

The present invention enables the preparation of decorated bakery products that can stored under ambient conditions for several days even though they comprise a fully cooked bakery product having a high water activity. Consequently, in accordance with a preferred embodiment of the present invention the fully cooked bakery product has a water activity of at least 0.85. Here the water activity is determined by measuring the water activity of the cooked dough or batter in the core of fully cooked bakery product.

The fully cooked bakery product is preferably selected from a doughnut, a muffin, a loaf cake and a bread roll. Most preferably, the fully cooked bakery product is a doughnut.

The invention is further illustrated by the following non-limiting examples.

EXAMPLES

Example 1

Ring doughnuts (45 grams) were prepared using the following recipe:

|  | Wt. % |
| --- | --- |
| Flour | 52.4 |
| Water | 28.0 |
| Doughnut concentrate | 15.2 |
| Fat | 1.8 |
| Yeast | 2.6 |

The doughnuts were proofed by placing them in a proofing cabinet for 60 minutes (35° C., 70% relative humidity). The proofed doughnuts were fried for 60 sec. on both sides in a travelling fryer in oil with a temperature of 180° C. Doughnuts were cooled down for 1 h. at room temperature after which they were decorated with an icing that had been prepared using the following recipe:

|  | Wt. % |
| --- | --- |
| Fat blend [1] | 34.0 |
| Lecithin | 0.3 |
| Flavour & Colorant | 0.05 |
| Cocoa powder | 7.3 |
| Mannitol [2] | 58.4 |

[1] Fat blend has a melting point of 30° C.
[2] MANNIDEX 16704 (particle sizes between 27 μm and 45 μm; from Cargill)

The icing was prepared in a Thermo mixer of UK Thermomix by:
1. melting fats by heating to approx 60-70° C.
2. adding lecithin and blending
3. adding powder ingredients (cocoa powder, mannitol) and blending until clear
4. adding flavouring and colouring mix until blended thoroughly
5. packing at a temperature between 40-50° C.

After this the doughnuts were frozen for 1 h. at −25° C. in a blast freezer, flow-wrapped with 12 pieces per box and stored for 1 week at −18° C.

Doughnuts were taken out of the flow wrap, defrosted and put in a clamshells, fitting 4 doughnuts per clamshell. These doughnuts were kept at room temperature for 8 days. After 1, 4 and 8 days storage the water content of the doughnut body and the icing were measured. After 4 days the doughnuts were evaluated by an expert panel.

After 4 days storage, the expert panel found that appearance and eating quality the icing and the doughnut body were essentially indistinguishable from fresh fried and decorated doughnuts.

The results of the water content measurements are shown in table 1.

TABLE 1

| Storage time | Water content (wt. %) | |
| --- | --- | --- |
| (days) | Icing | Doughnut body |
| 1 | 2.6 | 27.1 |
| 4 | 3.2 | 24.1 |
| 8 | 2.2 | 24.7 |

Example 2

Example 1 was repeated except that 25 wt. % of the mannitol powder was replaced by finely milled sucrose powder. This finely milled sucrose powder had the following particle size distribution:
$x_{10}$=1.04 μm
$x_{50}$=9.96 μm
$x_{90}$=33.31 μm
SMD=3.31 μm
MPS=13.91 μm The results of the water content measurements are shown in table 2.

TABLE 2

| Storage time | Water content (wt. %) | |
|---|---|---|
| (days) | Icing | Doughnut body |
| 1 | 3.1 | 26.5 |
| 4 | 8.9 | 22.9 |
| 8 | 9.1 | 22.5 |

Example 3

Example 1 was repeated except that 50 wt. % of the mannitol powder was replaced by the finely milled sucrose powder described in Example 2.

The results of the water content measurements are shown in table 3.

TABLE 3

| Storage time | Water content (wt. %) | |
|---|---|---|
| (days) | Icing | Doughnut body |
| 1 | 4.2 | 26.6 |
| 4 | 10.5 | 23.4 |
| 8 | 13.5 | 19.4 |

Example 4

Ring doughnuts (45 grams) were prepared using the same procedure and recipe as in Example 1. In addition, ring doughnuts were prepared using the same procedure and recipe, except that either 50% or 100% of the mannitol was replaced by the finely milled sucrose powder described in Example 2.

This time the water content of the doughnut body and the icing and the softness peak value were measured after 0, 1, 2, 5 and 8 days storage.

The softness peak value was determined by cutting the doughnuts in half and by carrying out a penetration test with a stainless steel probe with a circular diameter of 0.5 inch. The probe was pushed into the crumb over a distance of 12 mm at a speed of 0.5 mm/s while recording the force applied. The maximum force applied is the softness peak value.

The results of the water content measurements are shown in table 4.

TABLE 4

| Storage time (days) | 100% mannitol | | Mannitol/sucrose (1:1) | | 100% sucrose | |
|---|---|---|---|---|---|---|
| | Icing | Doughnut body | Icing | Doughnut body | Icing | Doughnut body |
| 0 | 1.2% | 26.2% | 0.7% | 30.1% | 1.3% | 27.6% |
| 1 | 3.5% | 28.3% | 4.8% | 29.2% | 6.3% | 28.0% |
| 2 | 1.7% | 27.8% | 7.4% | 29.4% | 8.4% | 24.5% |
| 5 | 1.8% | n.d. | 11.6% | 28.4% | 12.7% | 22.6% |
| 8 | 2.1% | 26.6% | 14.1% | 27.0% | 16.5% | 23.4% |

The results of the softness peak value measurements are shown in Table 5.

TABLE 5

| Storage time (days) | Softness peak value | | |
|---|---|---|---|
| | 100% mannitol | Mannitol/sucrose (1:1) | 100% sucrose |
| 0 | 199 | 205 | 187 |
| 1 | 271 | 302 | 206 |
| 2 | 327 | 344 | 332 |
| 5 | 399 | 530 | 553 |
| 8 | 448 | 556 | 741 |

Example 5

Ring doughnuts were prepared on the basis of the following recipe:

| | Wt. % |
|---|---|
| Flour | 54.2 |
| Water | 31.2 |
| Doughnut concentrate | 8.3 |
| Fat | 3.7 |
| Yeast | 2.6 |

The doughnuts were proofed by placing them in a proofing cabinet for 60 minutes (35° C., 70% relative humidity). The proofed doughnuts were fried for 60 sec. on both sides in a travelling fryer in oil with a temperature of 180° C. Doughnuts were cooled down for 1 h. at room temperature after which they were decorated with an icing that had been prepared using the following recipe:

| | Wt. % |
|---|---|
| Fat blend | 34.0 |
| Lecithin | 0.3 |
| Flavour & Colorant | 0.05 |
| Cocoa powder | 7.3 |
| Carbohydrate powder | 58.4 |

Three different carbohydrate powders were tested:
Mannitol: MANNIDEX 16704
Sucrose: the finely milled sucrose described in Example 2
Palatinose: (isomaltulose, 6-O-α-D-glucopyranosyl-D-fructofuranose). supplied by Beneo Palatinit GmbH, Mannheim, Germany The water content of the doughnut bodies and the icings were measured after 7 days storage under ambient conditions. The results of these measurements are shown in table 6.

TABLE 6

| Storage time (days) | Mannitol | Sucrose | Palatinose |
|---|---|---|---|
| 7 | 2.2% | 16.5% | 7.0% |

The invention claimed is:
1. An iced bakery product comprising a fully cooked bakery product having a water activity of at least 0.85 and a layer of an icing composition in an amount of 1-20 g/dm$^2$ comprising:
(a) 40-70 wt. % of fine carbohydrate particles comprising at least 90 wt. % of crystalline carbohydrate, wherein at least 90 wt. % of the fine carbohydrate particles have a diameter 1 to 50 pm, wherein the fine carbohydrate particles further comprise: (i) 75-100 wt. % of mannitol particles comprising at least 90 wt. % mannitol; (ii) 0-25 wt. % of sugar particles comprising at least 90 wt. % of one or more sugars selected from the group consisting of sucrose, glucose, fructose, lactose and maltose;

(b) 15-50 wt. % of fat having a melting point of at least 20° C.;

(c) 0-9.5 wt. % water; and (d) 0.1-30 wt. % of other edible ingredients.

2. The iced bakery product according to claim 1, wherein the icing composition contains less than 3 wt. % water.

3. The iced bakery product according to claim 1, comprising 2-25 wt. % of the other edible ingredients.

4. The iced bakery product according to claim 1, wherein the composition the other edible ingredients comprises 1-15 w % of cocoa powder.

5. The iced bakery product according to claim 1, wherein the mannitol particles and the sugar particles together represent at least 70 wt. % of the fine carbohydrate particles.

6. The iced bakery product according to claim 1, wherein the fine carbohydrate particles are homogeneously distributed throughout the composition.

7. The iced bakery product according to claim 1, wherein the bakery product is a frozen product.

8. The iced bakery product according to claim 1, wherein the bakery product is selected from a doughnut, a muffin, a loaf cake and a bread roll.

9. The iced bakery product according to claim 1, wherein the fine carbohydrate particles comprise 100 wt. % of mannitol particles comprising at least 90 wt. % mannitol.

* * * * *